United States Patent
Cho et al.

(10) Patent No.: US 9,084,015 B2
(45) Date of Patent: Jul. 14, 2015

(54) DISPLAY CONTROL APPARATUS AND METHOD FOR MOBILE DEVICE

(71) Applicant: Samsung Electronics Co. Ltd., Suwon-si, Gyeonggi-do (KR)

(72) Inventors: Chihyun Cho, Suwon-si (KR); Seyoung Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 13/660,199

(22) Filed: Oct. 25, 2012

(65) Prior Publication Data
US 2013/0113974 A1    May 9, 2013

(30) Foreign Application Priority Data
Nov. 7, 2011    (KR) .................. 10-2011-0115194

(51) Int. Cl.
| | |
|---|---|
| *H04N 5/222* | (2006.01) |
| *H04N 21/443* | (2011.01) |
| *H04N 5/232* | (2006.01) |
| *H04N 5/57* | (2006.01) |
| *H04N 21/414* | (2011.01) |
| *H04N 21/44* | (2011.01) |

(52) U.S. Cl.
CPC ....... *H04N 21/4436* (2013.01); *H04N 5/23293* (2013.01); *H04N 5/57* (2013.01); *H04N 21/41407* (2013.01); *H04N 21/44008* (2013.01)

(58) Field of Classification Search
CPC ................ H04N 5/57; H04N 5/23293; H04N 21/44008; H04N 21/4854
USPC .......... 348/333.12, 333.01; 345/690; 386/230
See application file for complete search history.

(56) References Cited

U.S. PATENT DOCUMENTS

| | | |
|---|---|---|
| 2006/0282850 A1 | 12/2006 | Kim |
| 2008/0297662 A1 | 12/2008 | Gibbs |
| 2009/0087016 A1 | 4/2009 | Berestov et al. |
| 2009/0303346 A1 | 12/2009 | Kanemitsu et al. |
| 2011/0115833 A1 | 5/2011 | Shimoyama |
| 2011/0176786 A1* | 7/2011 | Cooper et al. ................. 386/230 |
| 2013/0113974 A1* | 5/2013 | Cho et al. ................. 348/333.01 |

* cited by examiner

*Primary Examiner* — Antoinette Spinks
(74) *Attorney, Agent, or Firm* — Jefferson IP Law, LLP

(57) ABSTRACT

An apparatus and a method for controlling a display of a mobile device are provided. The method includes identifying a resolution of video data to be displayed in a video display mode, retrieving brightness control data corresponding to the identified resolution from a memory unit that stores a plurality of values of the brightness control data each of which corresponds to each of a plurality of resolution values, and sending the retrieved brightness control data to a display unit to display the video data with specific brightness determined based on the brightness control data.

10 Claims, 3 Drawing Sheets

DISPLAY CONTROL APPARATUS AND METHOD FOR MOBILE DEVICE

PRIORITY

This application claims the benefit under 35 U.S.C. §119(a) of a Korean patent application filed on Nov. 7, 2011 in the Korean Intellectual Property Office and assigned Serial No. 10-2011-0115194, the entire disclosure of which is hereby incorporated by reference.

BACKGROUND OF THE INVENTION

1. Field of the Invention

The present invention relates to display control technology for a mobile device. More particularly, the present invention relates to an apparatus and a method for dynamically controlling the brightness of a display unit depending on image resolution.

2. Description of the Related Art

Normally, a mobile device uses a battery as an operating power source. Due to limitations in the life of a battery, various methods for reducing power consumption of a battery have been proposed. One approach is to provide a low-power technique using circuitry.

Recently, the size of a display unit of mobile devices has been increasing. A mobile device can display an image of high resolution through a large-sized display unit, thus resulting in an increase of power consumption in connection with an image display. Use of a low-power camera module and a low-power image display module may reduce power consumption at module parts. However, a large-sized Liquid Crystal Display (LCD) used for a display unit and a video preview User Interface (UI) displayed on a display unit may still cause considerable power consumption.

Therefore, a need exists for an apparatus and a method for dynamically controlling the brightness of a display unit depending on image resolution.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for reducing power consumption caused by a large-sized display unit and a high-resolution image. Another aspect of the present invention is to provide an apparatus and a method for adjusting the brightness of a display unit by stages based on the resolution of displayed images.

More particularly, in order to improve power consumption when a video is recorded using a camera, an aspect of the present invention provides an apparatus and a method for reducing power consumption by controlling the resolution of a displayed image, depending on the resolution of an acquired image, without changing a camera module.

In accordance with an aspect of the present invention, a display control apparatus for a mobile device is provided. The apparatus includes a camera, a memory unit, a control unit, and a display unit. The camera is configured to acquire video data with predefined resolution in a video recording mode. The memory unit is configured to store brightness control data associated with resolution. The control unit is configured to control the camera with the predefined resolution in the video recording mode, to receive the video data from the camera, and to retrieve the brightness control data from the memory unit based on the resolution of the received video data. The display unit is configured to receive the brightness control data from the control unit, to determine the brightness of a display image based on the received brightness control data, to receive the video data from the control unit, and to display the received video data with the determined brightness.

In accordance with another aspect of the present invention, a display control method for a mobile device is provided. The method includes identifying a resolution of video data to be displayed in a video display mode, retrieving brightness control data corresponding to the identified resolution from a memory unit that stores a plurality of values of the brightness control data each of which corresponds to each of a plurality of resolution values, and sending the retrieved brightness control data to a display unit so that the display unit displays the video data with specific brightness determined based on the brightness control data.

In accordance with another aspect of the present invention, a display control method for a mobile device having a camera is provided. The method includes acquiring video data in a video recording mode by controlling the camera with predefined resolution, retrieving brightness control data corresponding to the predefined resolution from a memory unit that stores a plurality of values of the brightness control data each of which corresponds to each of a plurality of resolution values, and sending the retrieved brightness control data to a display unit so that the display unit displays the video data with specific brightness determined based on the brightness control data.

A mobile device according to aspects of the present invention may reduce power consumption of a display unit by restricting the brightness of a displayed image depending on the resolution of a video, especially, by reducing the brightness of a video displayed on a display unit when a high-resolution video is recorded.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
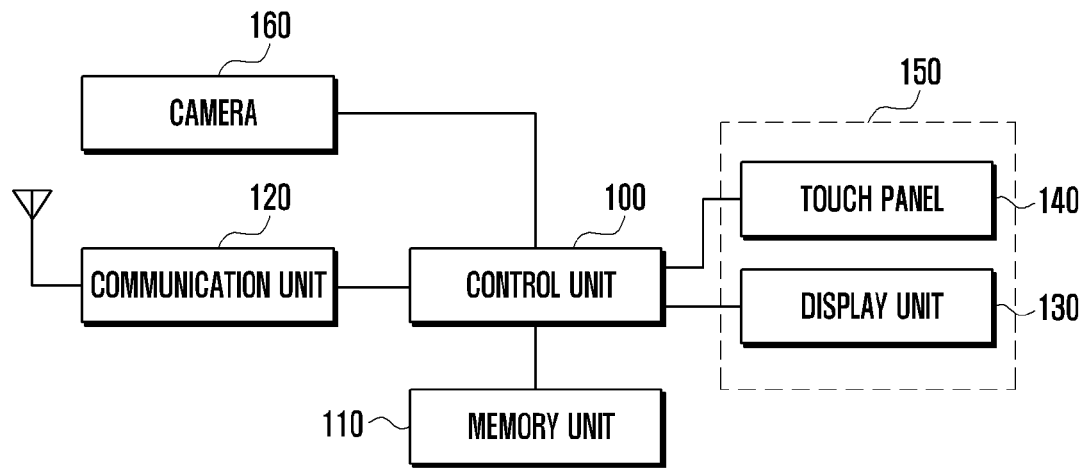
FIG. 1 is a block diagram illustrating a configuration of a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Well known or widely used techniques, elements, structures, and processes may not be described or illustrated in detail to avoid obscuring the essence of the present invention. Although the drawings represent exemplary embodiments of the present invention, the drawings are not necessarily to scale and certain features may be exaggerated or omitted in order to better illustrate and explain exemplary embodiments of the present invention.

According to an exemplary embodiment of the present invention, when displaying a video, a mobile device identifies the resolution of a displayed video and, based on the identified resolution, controls the brightness of a displayed image by stages so as to reduce power consumption. More particularly, when an image is acquired using a camera, a mobile device restricts the brightness of an image displayed on a display unit by resolution stages while processing the resolution of an acquired image as it is. In this disclosure, brightness control data refers to data for controlling the brightness of a display unit.

With the importance of multimedia function increased recently, a mobile device sets the default resolution for a video display to the maximum resolution. Additionally, if a user sets the brightness of a Liquid Crystal Display (LCD) to the maximum, they rarely change the brightness thereafter. When a mobile device records a video through a camera, the brightness of a display unit excessively uses hardware resources and thereby causes power consumption. However, an image displayed on a display unit is irrelevant to the resolution of an acquired image. Namely, regardless of a displayed image, a mobile device can store an acquired image while maintaining the resolution thereof. Therefore, an effective way of reducing power consumption is to restrict the maximum brightness of a displayed video depending on resolution.

Figure 2:
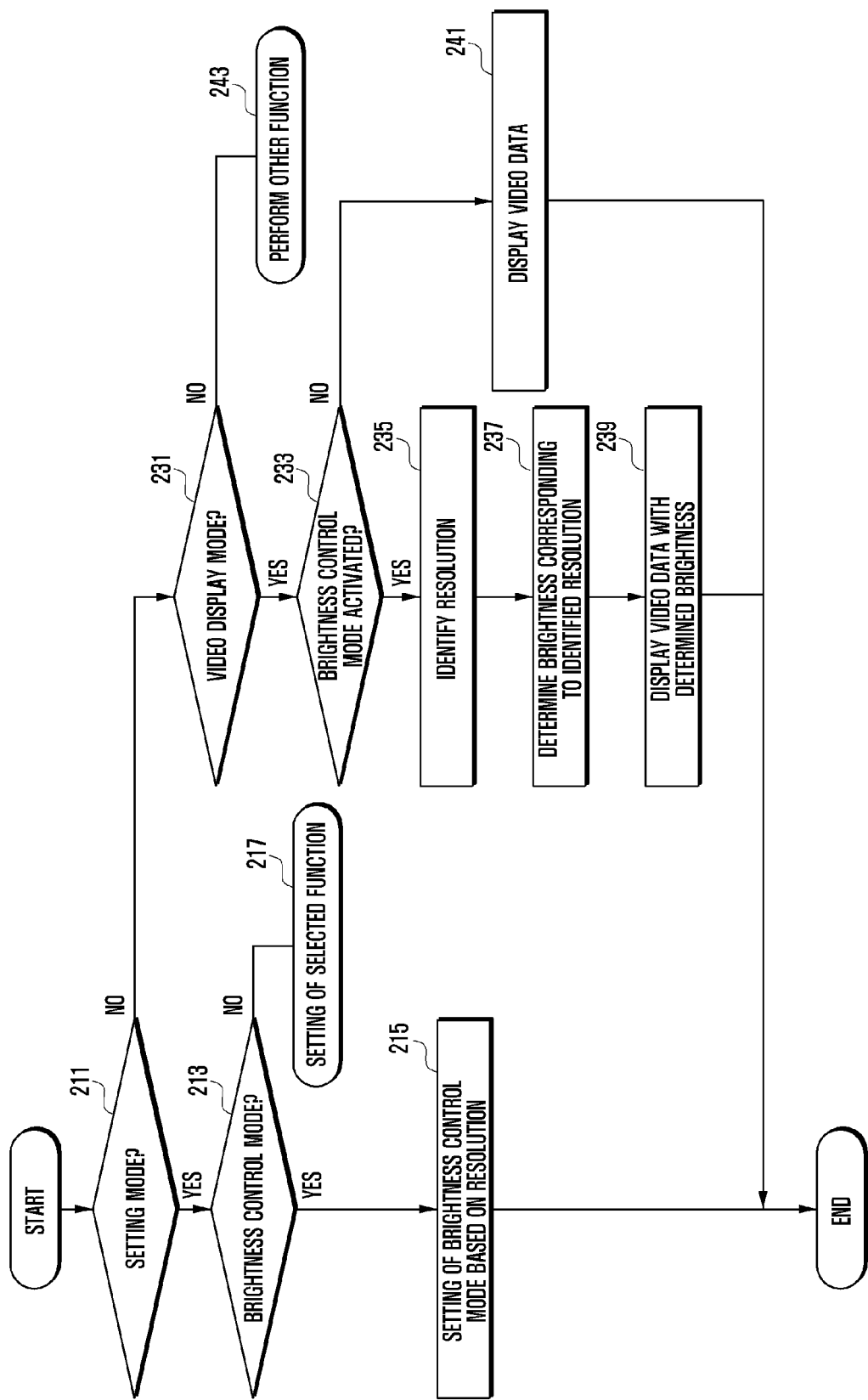
FIG. 2 is a flowchart illustrating a method for displaying a video according to an exemplary embodiment of the present invention.
Figure 3:
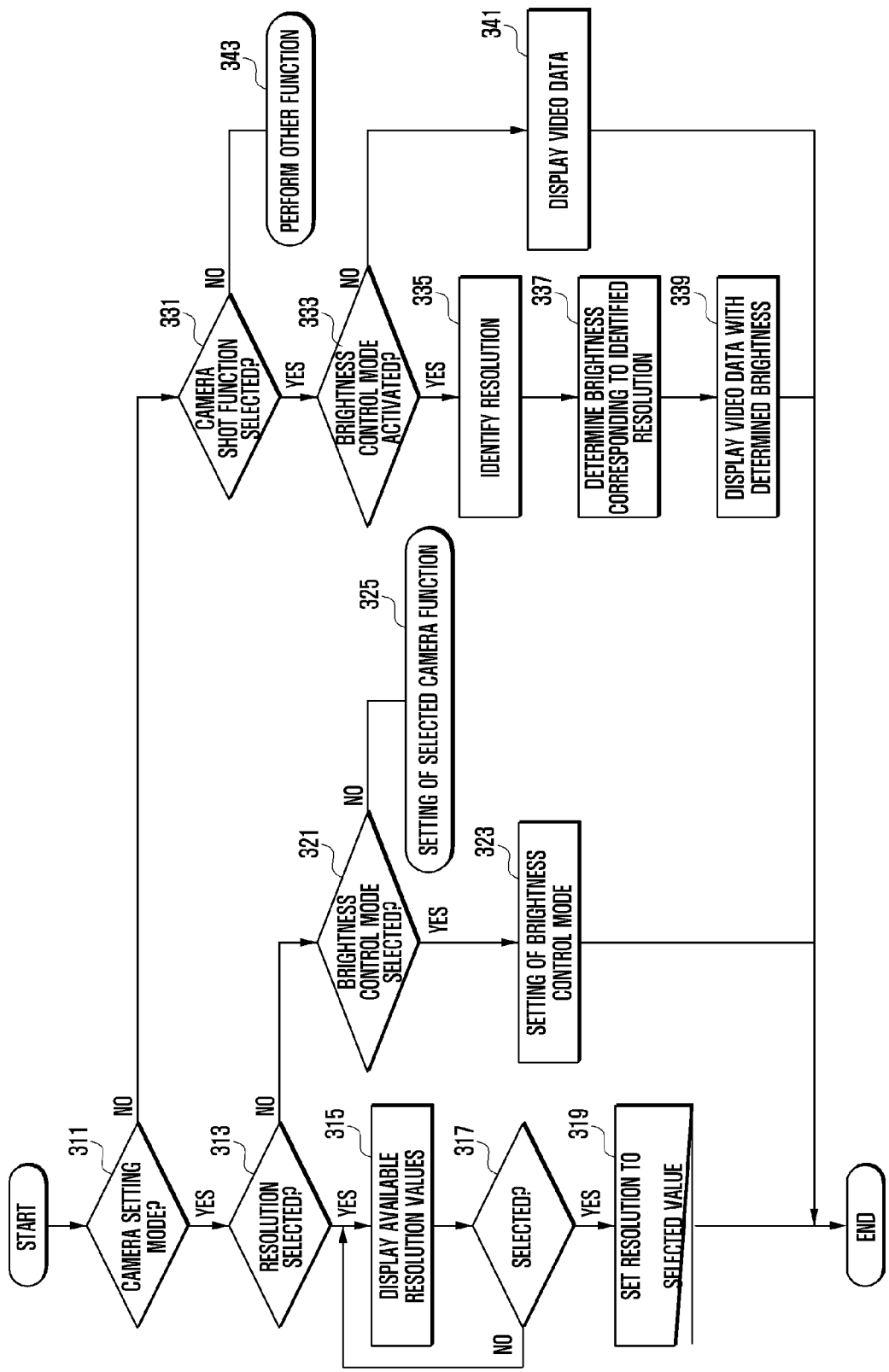
FIG. 3 is a flowchart illustrating a method for displaying an image being acquired by a camera according to an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a configuration of a mobile device according to an exemplary embodiment of the present invention.

Referring to FIG. 1, a communication unit 120 performs a wireless communication function with a base station or any other device. Here, the communication unit 120 may include a transmitter configured to up-convert the frequency of an outgoing signal and to power-amplify the signal, and a receiver configured to low-noise-amplify an incoming signal and to down-convert the frequency of the signal. In addition, the communication unit 120 may include a modulator and a demodulator. The modulator is configured to modulate an outgoing signal and to deliver the modulated signal to the transmitter, and the demodulator is configured to demodulate an incoming signal received through the receiver. The modulator and the demodulator may be designed for Long Term Evolution (LTE), Wideband Code Division Multiple Access (WCDMA), Global System/standard for Mobile communication (GSM), Wi-Fi, Wireless Broadband (WiBro), Near Field Communication (NFC), Bluetooth, and the like.

A control unit 100 controls operations of the mobile device. Specifically, when a video is displayed, the control unit 100 identifies the resolution of the video and, based on the identified resolution, controls the brightness of a displayed image. The control unit 100 may be formed of an application processor for controlling the execution of applications.

A memory unit 110 may include a program memory for storing operation programs of the mobile device and for storing specific programs associated with exemplary embodiments of the present invention. The memory unit 110 may further include a data memory for storing tables used to set the brightness according to the resolution of images and for storing data created during the execution of programs.

A display unit 130 controls the brightness of images displayed under the control of the control unit 100 and displays received images. The display unit 130 may be formed of an LCD, an Organic Light Emitting Diode (OLED), or any other equivalent. In an exemplary embodiment of the present invention, an LCD may be used. A touch panel 140 may be integrated with the display unit 130. The touch panel 140 detects a user's touch input and delivers it to the control unit 100. The display unit 130 and the touch panel 140 may construct a touch screen 150.

A camera 160 acquires an image with predefined resolution in a video recording mode. This resolution is determined under the control of the control unit 100.

The mobile device controls the brightness of a displayed image by stages according to the resolution of a video. This brightness control for displayed images by stages may reduce power consumption of the display unit by stages. In an exemplary embodiment of the present invention, the control unit 100 may activate a brightness control mode in a setting mode in response to a user input, and when a video display mode is selected, identifies the resolution of a video to be displayed. Thereafter, the control unit 100 controls the brightness of a displayed image based on the identified resolution, thus reducing power consumption of the display unit 130.

In this case, the memory unit 110 has a table that stores brightness control data based on image resolution. A restriction level of brightness is defined as a percentage of the maximum brightness and may be varied by a manufacturer and/or a user. If the resolution the mobile device can display is 1920*1080, 1280*720, 720*480, 640*480, 320*240, and 176*144, the brightness control data is stored in the memory unit 110 based on resolution as shown in Table 1.

TABLE 1

| Resolution | Brightness |
|---|---|
| 1920*1080 | 60% |
| 1280*720 | 70% |
| 720*480 | 80% |
| 640*480 | 90% |
| 320*240 | 100% |
| 176*144 | 100% |

As an example, it is assumed that the maximum brightness is 200 cd/m2 (candela/m2) in Table 1. If a video display mode is initiated while the display unit 130 is controlled with the maximum brightness of 200 cd/m2, the control unit 100 identifies the resolution of a displayed video and controls the display unit 130 with brightness corresponding to the identified resolution. For example, if the identified resolution is 1920*1080, the control unit 100 restricts the brightness of the display unit 130 to 200 cd/m2, namely, sixty percent (60%) of the maximum brightness (100%). Upon exiting a video display mode, the control unit 100 controls the operation of the display unit 130 with the maximum brightness 200 cd/m2.

Alternatively, in order to control the brightness of the display unit 130 based on resolution, both the minimum brightness and the maximum brightness may be used together. In this case, the maximum resolution is set to the minimum brightness, and any other resolution corresponds to other brightness that increases at a certain ratio. For example, if the minimum brightness and the maximum brightness are 100 cd/m2 and 200 cd/m2, respectively, and if there are six stages of resolution, the brightness may be restricted to 100 cd/m2 at the maximum resolution, be scaled up by 20 cd/m2 at next stages of resolution, and be restricted to 200 cd/m2 at the minimum resolution. In this case, the brightness control data based on resolution is stored in the memory unit 110 as shown in Table 2.

TABLE 2

| Resolution | Brightness (cd/m$^2$) |
|---|---|
| 1920*1080 | 100 |
| 1280*720 | 120 |
| 720*480 | 140 |
| 640*480 | 160 |
| 320*240 | 180 |
| 176*144 | 200 |

The brightness control data shown in Tables 1 and 2 are only exemplary and may be varied according to characteristics of the display unit 130 and/or by a user.

As discussed above, when the memory unit 110 stores a table for controlling the brightness of the display unit 130 according to resolution, the control unit 100 may control a display process of the display unit 130 by analyzing the resolution of images to be displayed in a video display mode. In this case, a user may activate or inactivate a brightness control mode of the display unit 130 in a setting mode. When a brightness control mode is activated, the control unit 100 identifies the resolution of a video to be displayed, and outputs brightness control data corresponding to the identified resolution to the display unit 130. Thereafter, the display unit 130 determines the brightness of display, based on the brightness control data. Thereafter, when display data is received from the control unit 100, the display unit 130 displays the received display data with the determined brightness. Here, the video display mode may be a video recording mode.

FIG. 2 is a flowchart illustrating a method for displaying a video according to an exemplary embodiment of the present invention.

Referring to FIG. 2, when a setting mode is selected through the touch panel 140, the control unit 100 detects it in step 211 and displays menus available in the setting mode. Thereafter, if a user selects a brightness control mode through the touch panel 140, the control unit 100 detects it in step 213 and performs a setting of the brightness control mode based on resolution in step 215. If any function other than the brightness control mode is selected in step 213, the control unit 100 performs a setting of the selected function in step 217.

If a setting mode is not selected through the touch panel 140 in step 211, the control unit 100 detects a selection of a video display mode in step 231 and determines whether the brightness control mode for controlling the brightness based on current resolution is activated in step 233. If so, the control unit 100 identifies the resolution of a video to be displayed in step 235. In addition, the control unit 100 retrieves the brightness control data corresponding to the identified resolution from the memory unit 110 and output the retrieved data to the display unit 130 in step 237. Thereafter, based on the brightness control data, the display unit 130 determines the brightness of an image to be displayed. Thereafter, the control unit 100 buffers display data in a frame buffer, and the display unit 130 reads the display data buffered in the frame buffer and displays it thereon with the determined brightness in step 239.

If a video display mode is not selected in step 231, the control unit 100 performs another function in step 243. If the brightness control mode is not activated in step 233, the control unit 100 buffers the display data in the frame buffer, and the display unit 130 reads the display data buffered in the frame buffer and displays the read data thereon in step 241. Here, the display unit 130 performs a display operation with the default brightness (i.e., the maximum brightness) or any other brightness predefined by a user regardless of the resolution of image data.

As discussed above, if a brightness control function is activated in the video display mode, the mobile device performs a display function with the brightness determined depending on the resolution of image data. This may reduce power consumption of the display unit 130. Here, the video display mode may be a video recording of the camera 160, a movie play mode, a broadcast receiving mode, a game mode, or the like.

A brightness control for the display unit 130 may be effective in displaying a video recorded by the camera 160. In most cases, a user of the mobile device uses the maximum resolution available in the camera 160 when recording a video or taking a photo (i.e., a digital image). The control unit 100 compresses an image acquired by the camera 160 and stores the compressed image in the memory 110, while displaying the acquired image on the display unit 130. If images displayed on the display unit 130 are restricted in brightness, the resolution of images stored in the memory unit 110 is not affected. More particularly, when an image is acquired with the maximum resolution through the camera 160, image data stored in the memory unit 110 is the acquired image itself having the maximum resolution, whereas the brightness of image data displayed on the display unit 130 is restricted to a predefined value. Therefore, by restricting the brightness of the display unit 130 during image acquisition, such as a video recording through the camera 160, it is possible to reduce power consumption of the display unit 130.

FIG. 3 is a flowchart illustrating a method for displaying an image being acquired by a camera according to an exemplary embodiment of the present invention.

Referring to FIG. 3, the control unit 100 detects if a camera setting mode is selected in step 311, and displays menus available in the camera setting mode on the display unit 130. Here, menus available in the camera setting mode may be resolution, white balance, outdoor visibility, video quality, a brightness control mode, and the like. If a resolution menu is selected by a user through the touch panel 140, the control unit 100 detects it in step 313 and displays available resolution values in step 315. In this exemplary embodiment, it is supposed that available resolution values are 1920*1080, 1280*720, 720*480, 640*480, 320*240, and 176*144. If a specific resolution value for a video recording is selected by a user, the control unit 100 detects it in step 317 and sets the resolution to the specific value selected by a user in step 319. If a brightness control mode is selected in the camera setting mode, the control unit 100 detects it in step 321 and performs a setting of the brightness control mode for controlling the brightness of the display unit 130 during a video recording in step 323. If any function other than the resolution and the brightness control mode is selected, the control unit 100 performs a setting of the selected camera function in step 325.

If a camera setting mode is not selected through the touch panel 140 in step 311, the control unit 100 detects if a camera shot function is selected in step 331 and determines whether the brightness control mode for controlling the brightness of the display unit 130 is activated in step 333. If so, the control unit 100 identifies the resolution of a video to be displayed in step 335. In addition, the control unit 100 retrieves the brightness control data corresponding to the identified resolution from the memory unit 110 in step 337 and outputs the retrieved data to the display unit 130. Thereafter, based on the brightness control data, the display unit 130 determines the brightness of an image to be displayed. Thereafter, the control unit 100 sends image data acquired by the camera 160 to the display unit 130, and the display unit 130 displays the acquired image data with the determined brightness in step 339. In step 339, while displaying the image data, the control unit 100 compresses the image data through a codec and stores the compressed data in the memory unit 110. Therefore, with the determined brightness, the data acquired by the camera 160 is displayed on the display unit 130 and stored in the memory unit 110.

If a camera shot function is not selected in step 331, the control unit 100 performs another function in step 343. If the brightness control mode is not activated in step 333, the control unit 100 sends the image data received from the camera 160 to the display unit 130, and the display unit 130 reads and displays the display data thereon in step 341. Here, the display unit 130 performs a display operation with the default brightness (i.e., the maximum brightness) or any other brightness predefined by a user regardless of the resolution of image data.

As discussed above, the mobile device may control the brightness of the display unit 130 by stages based on resolution in a video display mode which may reduce power consumption of the display unit 130.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
   a camera configured to acquire video data with a predefined resolution in a video recording mode;
   a memory unit configured to store brightness control data, the brightness control data being set to adjust a brightness of a display unit according to the resolution of the video data such that the brightness of the display unit decreases as the resolution of the video data increases; and
   a control unit configured:
      to control the camera with the predefined resolution in the video recording mode,
      to receive the video data from the camera, and
      to determine the brightness of the display unit, when the display unit outputs the video data, according to the resolution of the video data by using the brightness control data stored in the memory unit,
   wherein the display unit is configured to output the video data with the determined brightness.

2. The mobile device of claim 1, wherein the control unit is further configured:
   to execute a brightness control mode,
   to receive the video data to be displayed, and
   to determine the brightness of the display unit, when the brightness control mode is executed, according to the resolution of the video data by using the brightness control data stored in the memory unit.

3. The mobile device of claim 2, wherein the video data comprises at least one of a video recording, a movie, a broadcast, and a game.

4. A display control method for a mobile device, the method comprising:
   identifying a resolution of video data;
   retrieving brightness control data from a memory unit, the brightness control data being set to adjust a brightness of a display unit according to the resolution of the video data such that the brightness of the display unit decreases as the resolution of the video data increases;
   determining the brightness of the display unit, when the display unit outputs the video data, according to the resolution of the video data; and
   outputting the video data with the determined brightness by using the display unit.

5. The method of claim 4, further comprising:
   activating a brightness control mode;
   determining whether the brightness control mode is activated;
   outputting, when the brightness control mode is activated, the video data with the determined brightness; and
   outputting, when the brightness control mode is not activated, the video data with a default brightness of the display unit.

6. The method of claim 5, wherein the video data comprises at least one of a video recording, a movie, a broadcast, and a game.

7. A display control method for a mobile device having a camera, the method comprising:
   acquiring video data in a video recording mode by controlling the camera with a predefined resolution;

retrieving brightness control data from a memory unit, the brightness control data being set to adjust a brightness of a display unit according to the resolution of the video data such that the brightness of the display unit decreases as the resolution of the video data increases;

determining the brightness of the display unit, when the display unit outputs the video data, according to the resolution of the video data; and outputting the video data with the determined brightness by using the display unit.

8. The method of claim 7, further comprising:

activating a brightness control mode;

determining whether the brightness control mode is activated;

outputting, when the brightness control mode is activated, the video data with the determined brightness; and outputting, when the brightness control mode is not activated, the video data with a default brightness of the display unit.

9. The method of claim 8, further comprising:

selecting the resolution in the camera setting mode.

10. The method of claim 9, wherein the video data comprises at least one of a video recording, a movie, a broadcast, and a game.

* * * * *